April 25, 1961     W. J. WALSH, SR     2,981,831
AUTOMATIC SPEED ZONE CONTROL FOR RAILROAD TRAINS
Filed April 23, 1956     5 Sheets-Sheet 1
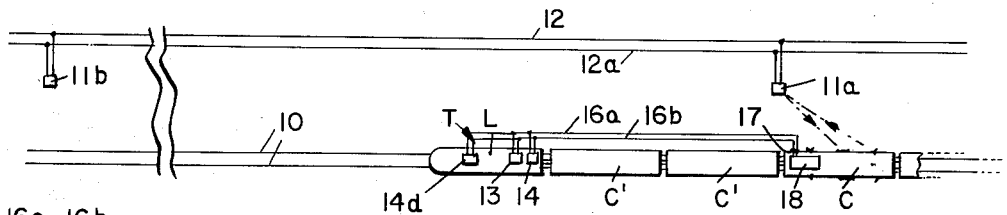
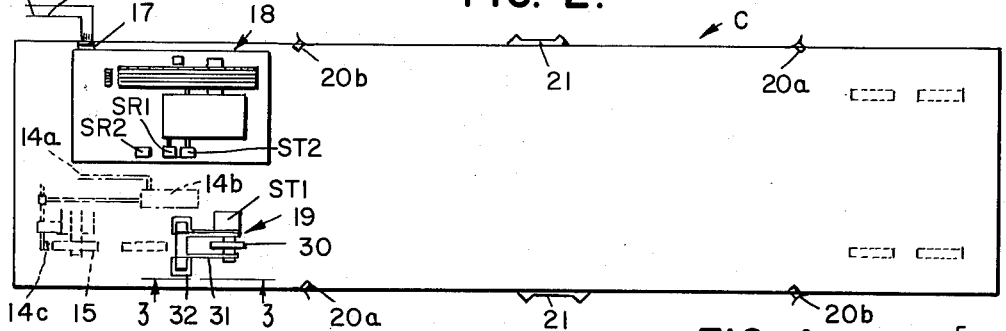
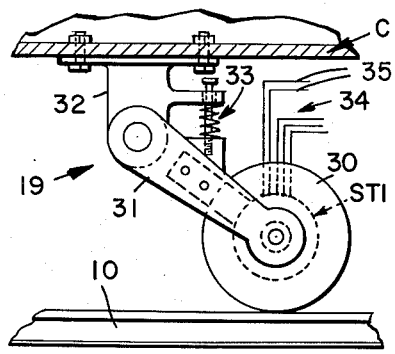
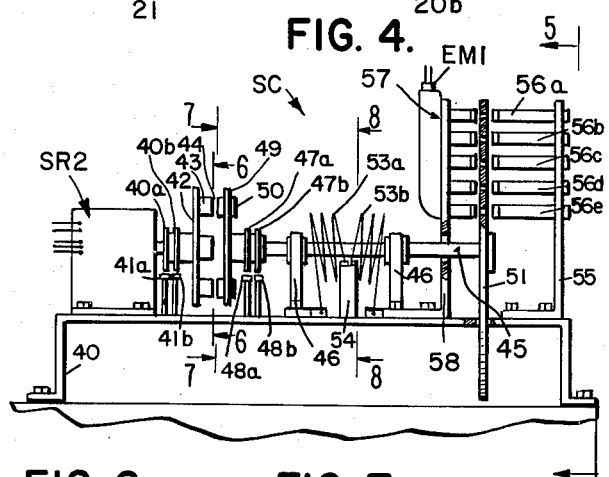
INVENTOR
William J. Walsh, Sr.

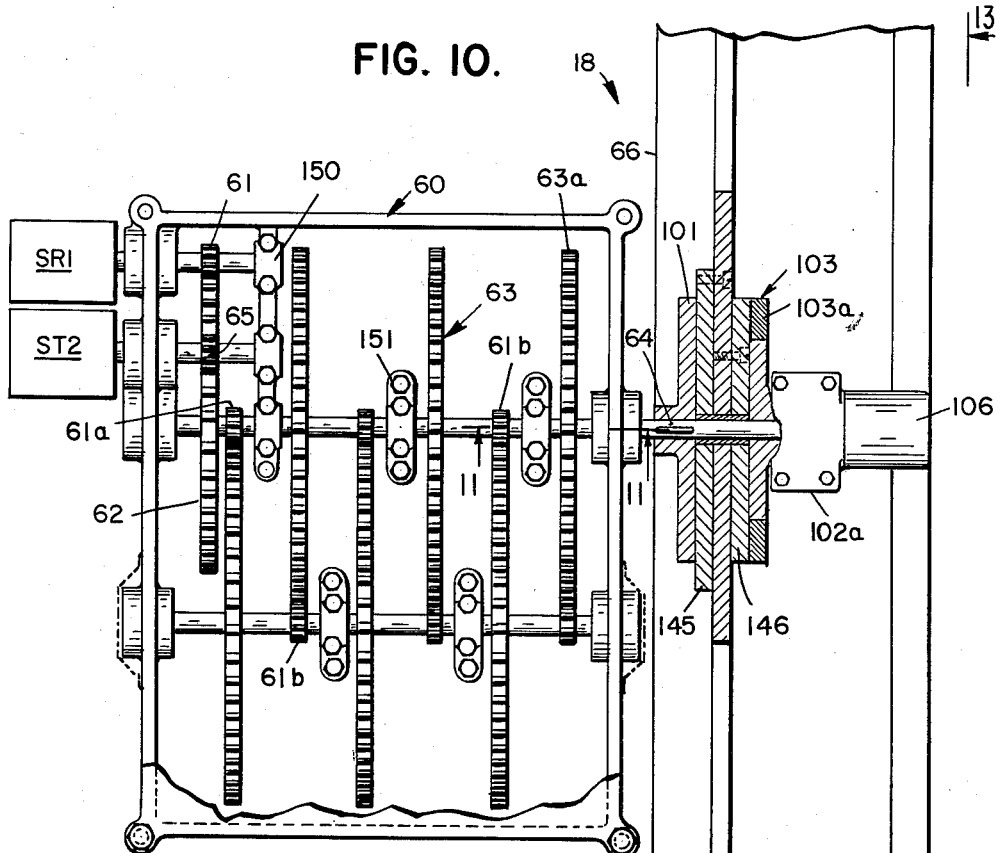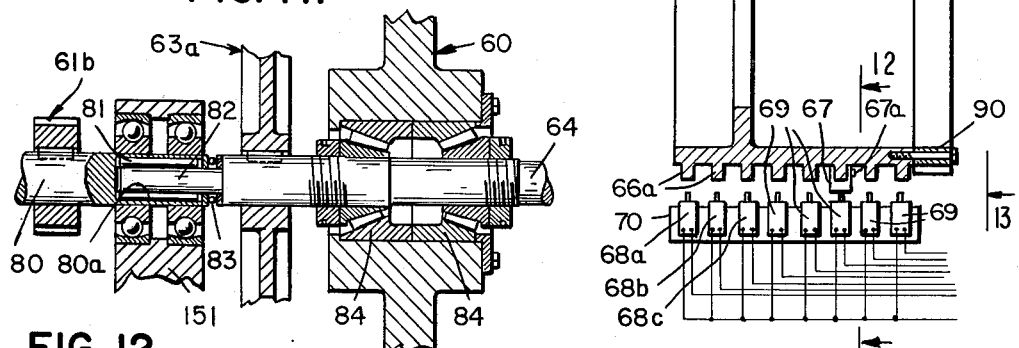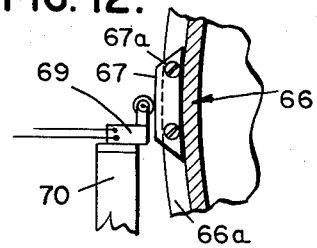

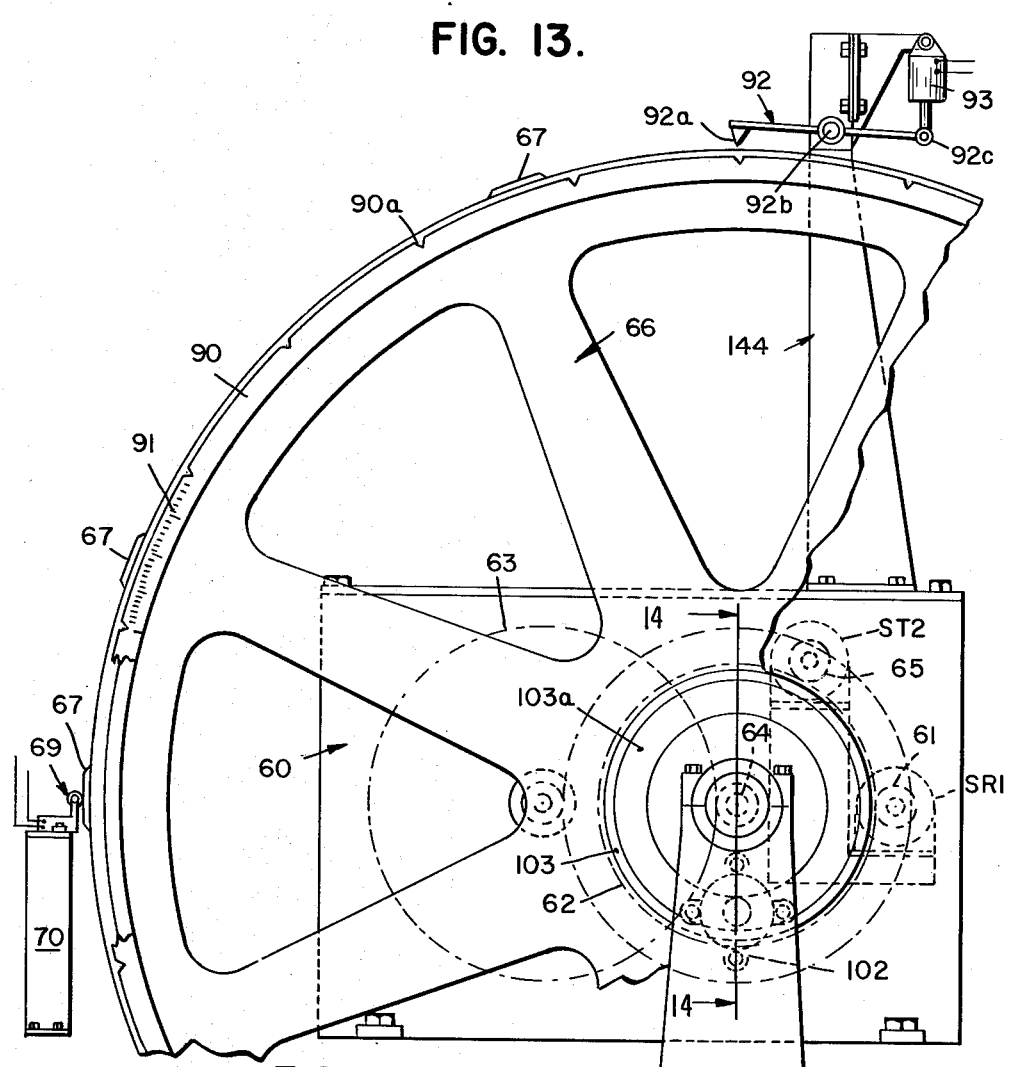
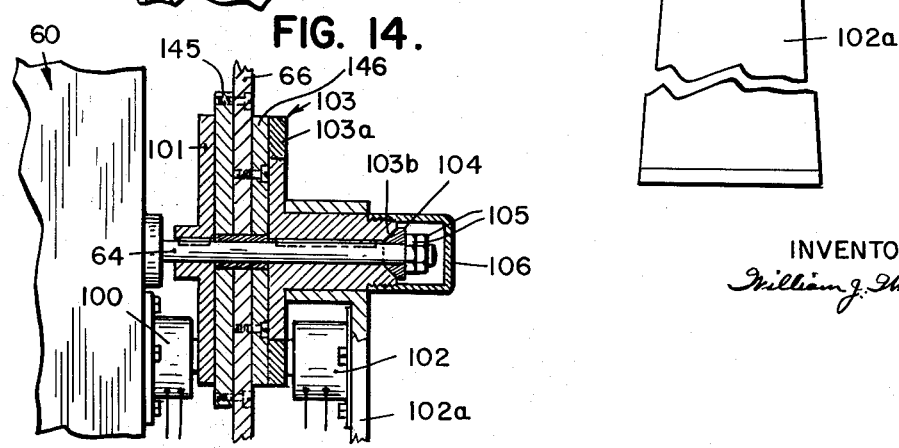

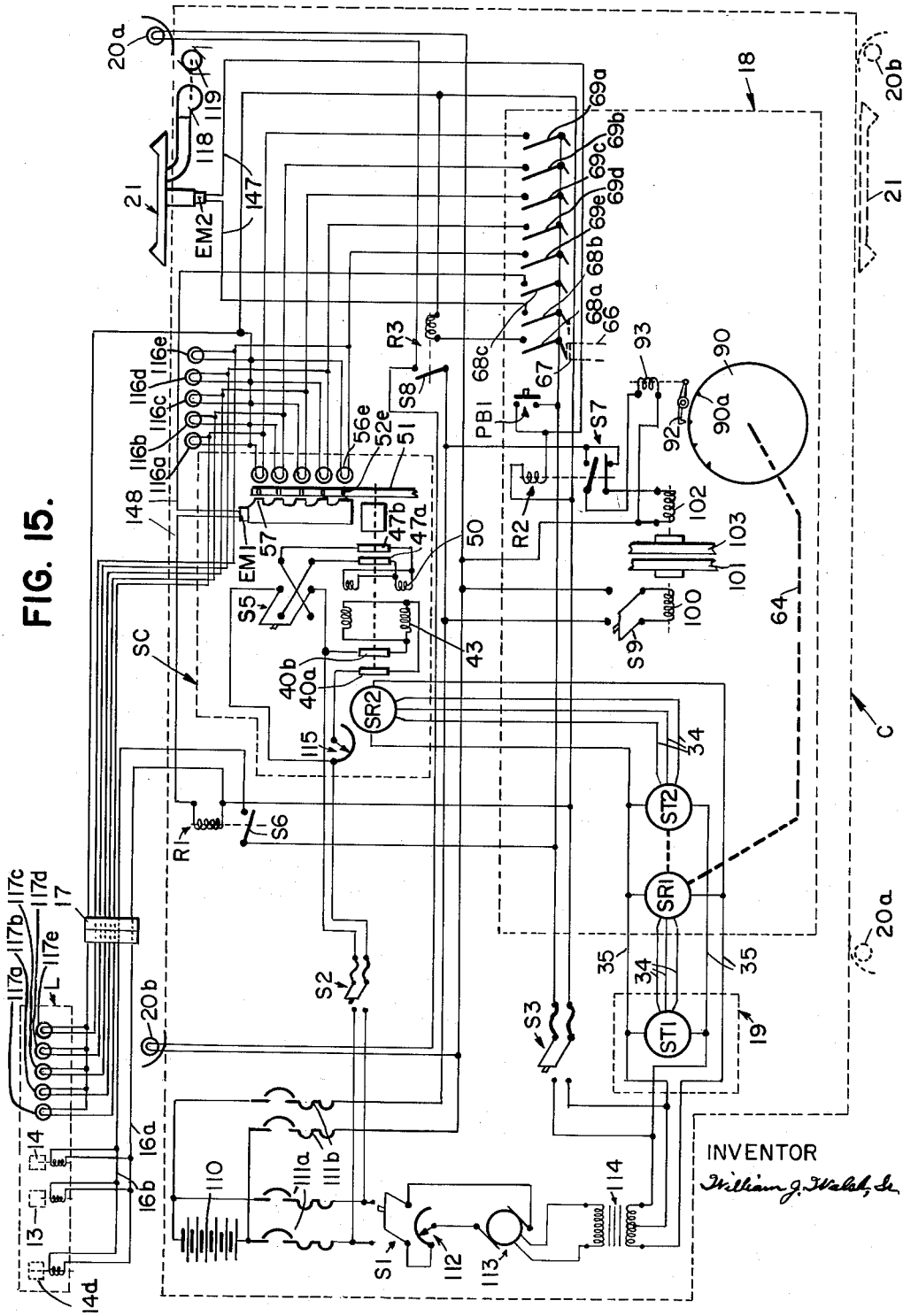

April 25, 1961 W. J. WALSH, SR 2,981,831
AUTOMATIC SPEED ZONE CONTROL FOR RAILROAD TRAINS
Filed April 23, 1956 5 Sheets-Sheet 5

INVENTOR
William J. Walsh, Sr.

United States Patent Office 2,981,831
Patented Apr. 25, 1961

2,981,831

AUTOMATIC SPEED ZONE CONTROL FOR RAILROAD TRAINS

William J. Walsh, Sr., P.O. Box 75304, Sanford Station, Los Angeles, Calif.

Filed Apr. 23, 1956, Ser. No. 579,826

4 Claims. (Cl. 246—182)

This invention relates to an automatic speed zone control for railroad trains which will operate satisfactorily under all weather conditions and is designed to control the speed of the train entirely independently of the engineer, as the train approaches a given speed zone, as well as controlling thru the length of the speed zone.

An object of the invention is to permit faster, but safer train speeds even under bad visibility conditions.

Another object of the invention is to automatically take control of the speed of the train away from the engineer, should he err.

Another important object of the invention is to warn, by indicating lights, the engineer as speed zones are approached and the maximum speed that the train can travel without this invention shutting off the fuel supply with a solenoid valve at the injector on the locomotive and opening a solenoid valve between the main feed valve and the main brake pipe that applies the brakes of the train as the air enters from the main air reservoir, through the feed valve, to the brake pipe, bypassing the automatic brake valve of the locomotive, and completely isolating the automatic brake valve functions from applying, or releasing, the brakes of the train, with solenoid valves energized from the master relay, on this invention.

Another object of the invention is to permit greater utility of the main rail trunk lines, incident with consistent, faster and shorter time schedules.

Another object of the invention is the public's safety, by preventing train wrecks caused by speed violations of speed zones, which this invention will prevent.

These and further objectives and accomplishments of the invention, and the invention itself, will be best understood from the following description of a preferred and illustrative conception, referring to the accompanying drawings, of which there are five sheets, in which:

Fig. 1 is a diagrammatic view showing a train passing a photo-electric station located along the route of said train.

Fig. 2 is an enlarged schematic view of one of the cars of the train, said car containing a portion of the device embodying my invention.

Fig. 3 is an enlarged fragmentary sectional view taken along the lines 3—3 of Fig. 2.

Fig. 4 is a side elevation of the speed control mechanism.

Fig. 5 is an end elevation of the device shown in Fig. 4 the view being taken on the line 5—5 of Fig. 4.

Fig. 6 is a sectional view taken along the lines 6—6 of Fig. 4.

Fig. 7 is a sectional view taken along the lines 7—7 of Fig. 4.

Fig. 8 is a sectional view taken along the lines 8—8 of Fig. 4.

Fig. 9 is a fragmentary elevation taken on the lines 9—9 of Fig. 8.

Fig. 10 is a plan view of the gear box, portions being broken away and portions shown in section.

Figs. 11 and 12 are fragmentary sectional views taken along the lines 11—11 and 12—12 of Fig. 10.

Fig. 13 is a fragmentary end elevation of the gear box, the view being taken along the lines 13—13 of Fig. 10.

Fig. 14 is a sectional view taken along the lines 14—14 of Fig. 13.

Figure 16:
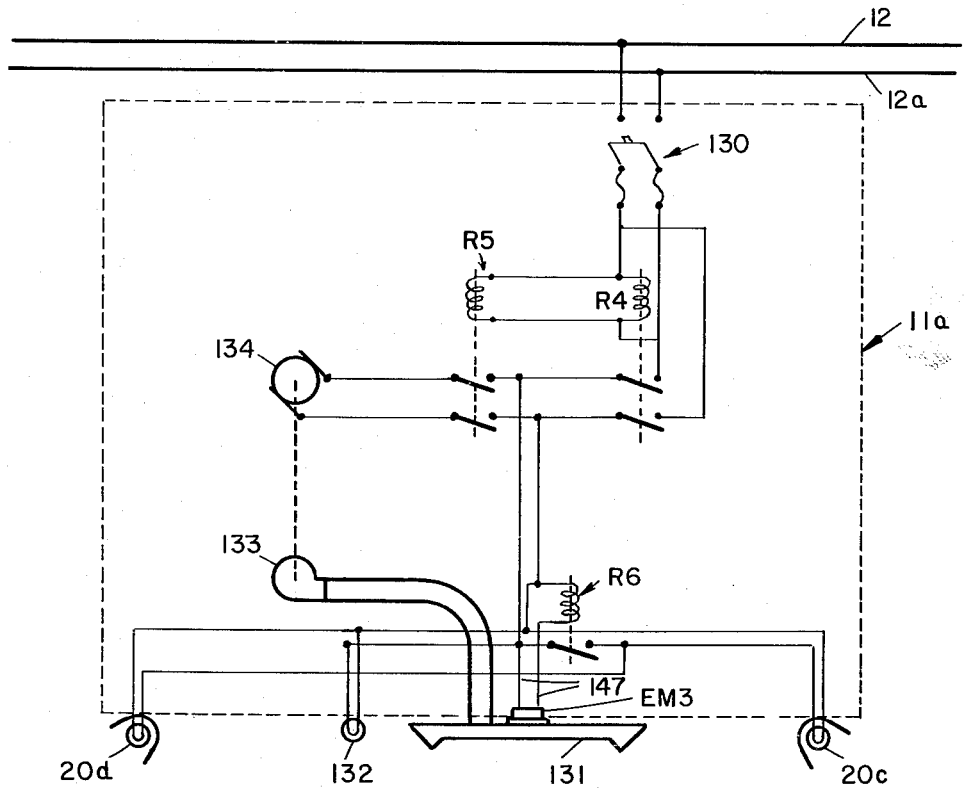

Figs. 15 and 16 are wiring diagrams illustrating the various mechanical and electrical devices as arranged for embodiment in my invention.

Figure 17:
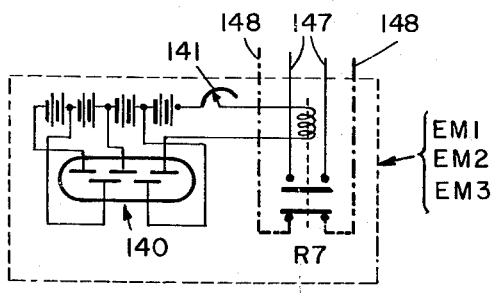

Fig. 17 is an electrical schematic of the electronic multiplier tube that operates the sensitivity relays which are employed in EM1, EM2, and EM3, of Figs. 15 and 16. A potentiometer is also shown.

Figure 18:
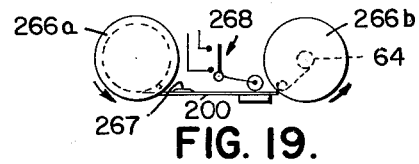
Figure 19:
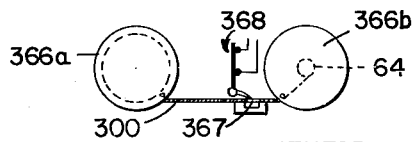
Figure 20:
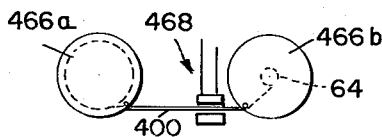

Figs. 18, 19 and 20 are schematic views of modified forms of timing-calibrated elements applicable to the general arrangement of means shown in Figs. 1 to 17 inclusive.

In Fig. 1, 12 and 12a are electric supply lines furnishing electricity for the photo-electric stations 11a and 11b.

The tracks are 10. L is the locomotive, and C', C' are the cars of the train T. In car C, unit 18 is the gear reduction and timing mechanism, and unit 17 is a plug connector connecting the electrical circuits from car C to locomotive L. For simplicity, wires 16a and 16b are shown connected to three solenoids 13, 14 and 14d in locomotive L. There are indicating lamps 117 (see Fig. 15). The solenoid valve 14d isolates the release airport of the automatic brake valve (not shown) of the locomotive L. The solenoid valve 14 applies the brakes, and solenoid valve 13 shuts off the fuel at the injector.

In Fig. 2, the rail contact wheel 30 measures the distance and turns ST1, which is a selsyn transmitter that drives SR1, which is a selsyn receiver that drives the gear train 60 of the timing unit 18. The pivoted arm assembly 19 holds the measuring wheel 30 in contact with the track 10 (see Fig. 3). The pivot bracket 32 is for the pivot arm 31. An air line 14a connects to the air cylinder 14b that applies the brake shoes 14c on wheel 15 shown in dotted lines which are not a part of this invention, but existing equipment on the car. ST2 is a selsyn transmitter that is driven off the gear 62 (see Fig. 10). SR2 is a selsyn receiver that is driven by ST2 (see Fig. 15). Exciting spotlights 20a and 20b for 11a (Fig. 1) are mounted outside and on car C. A chrome tube 21 open at both ends, housing an electronic multiplier tube receiving its excitation from 11a (Fig. 1) is also mounted on and outside of car C. 20a, 20b and 21 are shown on both sides of the car C, so that the excitation pick up is obtained when the car C is turned around and traveling in the opposite direction. A plug connector 17 is for circuits 16a and 16b wires, and circuits for warning lights 117 a, b, c, d, and e (Fig. 15).

In Fig. 3, a side view shows a section of car C supporting the pivot bracket 32 and the pivot limiter and spring loader 33. The rail contact measuring wheel 30 is mounted on tapered roller bearings to the pivot arm 31, which is attached to the pivot bracket 32. Shown in dotted lines are ST1 and the bracket that holds ST1 to the pivot arm 31 so that ST1 moves in the same radius with wheel 30, which drives ST1 direct as the wheel 30 rolls on the track 10. The stator circuit 34 connects to the stator of SR1 (Fig. 15). The rotor wires 35 are connected to line wires from transformer 114 (Fig. 15).

In Fig. 4, speed control unit SC, SR2 receives its electrical stator source from ST2 and its rotor supply from transformer 114 (Fig. 15) whereof ST2 is driven by gear 62 (of Fig. 10). Mounted on the output shaft's exterior end of SR2 are collector rings 40a and 40b and a disc 42 holding four coils 43. Coils 43 are connected to the insulated collector rings 40a and 40b, which are energized from brushes 41a and 41b (Fig. 4); there are two coils 50 mounted in a brass disc 49, one-half of the coils 50 winding being on the back side of the brass disc 49, shielded from magnetic flux emitted from coils 43 on disc 42. There are insulated collector rings 47a and 47b located on the input shaft 45 connecting coils 50 and energizing from brushes of brush holders 48a and 48b. The shaft 45 extends from disc 49 to the tight transfer speed indicating dial 51, and is supported by cap bearing standards 46. There are two springs 53a and 53b that zeros the light transfer speed indicating dial when the train is not moving, one end of each spring being attached to base 40 and the other end of each spring 53a and 53b held by a slotted anchor 54 (see Figs. 8 and 9) that resists the positional change of disc 51 in one direction, for one spring and resists rotation in the opposite direction by the other spring when the train is moving. Thus, this operation is both clockwise and counter-clockwise, the direction of the train's travel determining which. There are five exciting lights 56a, 56b, 56c, 56d and 56e mounted on a bracket 55 in front of the light transfer speed indicating dial 51, said lights to shine through elongations of disc 51 into a chrome housing 57 that contains light pick-up EM1 that is mounted on bracket 58. The entire speed control unit SC of Fig. 4 is mounted on a base 40. An air gap 44 is between discs 42 and 49.

The electrical conductors indicated by the reference numeral 111a (Fig. 15) supply current to the collector rings 40a and 40b in unit SC, thence to coils 43 on disc 42. The same conductors 111a also supply current to the collector rings 47a and 47b in unit SC, thence to the coils 50 on disc 49 (Fig. 4). The rotative speed (dependent on the train's speed) of output disc 42 that holds coils 43, in terms of r.p.m., determines the electro-magnetic force which repels and attracts the input disc 49 that holds coils 50 by virtue of the fact that the coils 43 are wound and positioned in a longitudinal plane while the coils 50 on disc 49 are wound in a traverse plane.

Fig. 5 shows the arcuate slots 52a, 52b, 52c, 52d and 52e in the light transfer speed indicating dial 51 along with the bracket 55 that the exciting lights 56a, 56b, 56c, 56d and 56e are mounted on. The shaft 45 is shown in dotted lines and this figure shows the elements 51 in zero speed position.

In Fig. 10 is a top view of the gear train unit 18 and timing wheel 66 showing the subsequent cams 67 contacting microswitches 68a, 68b, 68c and 69. Screws 67a are holding cam 67 on peripheral ribs 66a on timing wheel 66. Micro-switches 68a, 68b, 68c and 69a, 69b, 69c, 69d and 69e are mounted on a bracket 70. There is a ring 90 that has V-notches 90a (Fig. 13) on the edge of wheel 66 for the engagement of the slip compensator V-projector 92a (Fig. 13). The shaft of SR1 projects inside the gear train box 60 and has ball bearings supported by bearing standards 150 and has an input pinion gear 61 that engages gear 62, which SR1 drives. The shaft of ST2 also projects inside the box 60 and has an output pinion gear 65 that drives ST2 by engaging gear 62. ST2 in turn drives SR2. On the shaft that gear 62 is mounted on, there is also a pinion 61a. Gear 61A and 62 are keyed on the same shaft, one end being mounted on tapered roller bearings in the gear box 60 and the other end has a pilot shaft protruding into the counter bore of the next inline shaft. Said pilot shaft has a roller bearing on the pilot protruding into the counter bore of the next inline shaft. Also on the pilot but not contained in the counter bore are thrust washers and a thrust ball bearing. On the outside diameter of the shaft at the counter bore, there are two ball bearings contained in a bearing support 151 that is bolted to the bottom of the gear box and shimmed to exact alignment. Said bearing support 151 to have a cap bolted on the top to contain the ball bearings (see Fig. 11). There are 7 gear reductions illustrated in this Fig. 10; five are identical in construction; the other two are, excepting the gear ratios and the ends that are supported in the gear box 60 and the final output shaft 64 that drives wheel 66. Gear 63 and its keyed pinion 61b are typical of the five identical reductions mentioned. Shaft 64 protrudes out of the gear box 60 and on it there is mounted an inner flange 101 that is keyed to shaft 64, a brass disc 145 is screwed on the inner side of wheel 66 to insulate the magnetic flux of the magnetic brake coil 100 and confining the flux to the circuit of flange 101, to shaft 64, to gear box 60, to armature core of coil 100 (see Fig. 14). On the outer side of wheel 66, there is a steel disc 146 screwed on wheel 66 to provide a magnetic flux path from clutch coil 102. The outer flange 103 is keyed to shaft 64, said flange 103 to be of brass, excepting the outer rim 103a which is of steel to conduct the magnetic flux from coil 102, through ring 103a, to disc 146, to shaft 64, to outside bearing support 102a, to armature core of coil 102 (see Fig. 14). There is a cover 106 provided for the end of shaft 64 and flange hub 103. Relative speed is transmitted from ST1 to SR1, which drives wheel 66 (see Fig. 10). ST2 is driven mechanically by SR1 and, in turn, ST2 drives SR2 electrically, which is the activation through which the speed indicating dial 51 (see Fig. 5) receives its position, through the arrangements in Fig. 4, when the train is in motion.

Fig. 11 shows a side view of the pilot shaft 82 and roller bearing 81 and thrust bearing 83 with opposed thrust taper roller bearings 84 on the final output shaft 64 protruding through the gear box 60 and showing the aligning ball bearing support 151 that is mounted to the bottom of gear box 60. The counter bore shaft and 80a of shaft 80 contains the roller bearing 81 in which pilot shaft 82 fits. The ball thrust bearing is outside of the counter bore and ball bearing support 151. Gear 63a is keyed to shaft 64 and gear 61b is keyed to shaft 80.

Fig. 12 shows a sectional view of the edge of wheel 66 showing a cam 67 contacting a micro-switch 69 that is mounted on a bracket 70. The cam 67 is held on the peripheral rib 66a by screws 67a.

Fig. 13 shows a fragmentary view of timing wheel 66 showing V-notches 90a in the rim 90. The rim 90 is calibrated as at 91 for cam 67 settings. The bracket 70 is shown supporting micro-switches 69 contacting a cam 67. The bracket 144 is supporting the slip compensator solenoid coil 93. Its armature 92c is attached to one end of a lever 92 that is pivoted on a shaft 92b. The other end of lever 92 has a V-projection 92a that engages notches 90a as the train passes photo-electric stations 11a and 11b, etc. (Fig. 1) on the train's route. The brass flange 103 and the steel ring 103a is shown. In dotted lines are shown gears 63, gear 61, gear 62, ST2, pinion 65, shaft 64, SR1 and clutch coil 102. The outside support bracket 102a is shown with a bolted cap at its top.

Fig. 14 shows the frusta-conical counter bore 103b and the frusta-conical counter busher 104, the lock nuts 105, the cap 106, the clutch coil 102, the outside supporting brackets 102a, the brake coil 100, the shaft 64, and the gear train box 60.

In Fig. 15 is shown an electrical diagram of the equipment of this invention that is installed on the train. The storage battery 110 is shown connected to multibreaker 111a and multibreaker 111b. Multibreaker 111b feeds a D.C. power circuit for heavy duty solenoids, such as, the brake coil 100, clutch coil 102, slip compensator coil 93, and the exciter spotlights 20a and 20b in and on car C. Multibreaker 111a feeds switch S2 for the speed control unit SC and its rheostat 115 and collector rings 40a, 40b and field coils 43 on disc 42 (Fig. 4), and field coils 50 on disc 49 (Fig. 4), fed through a double pole double throw switch S5 (for reversing the polarity of coils 50), and collector rings 47a and 47b. Multibreaker 111a also feeds a D.C. circuit for a double pole fused switch S1 that feeds through rheostat 112 and to a single-phase rotary converter 113 that supplies the primary of a voltage regulating single-phase transformer 114 with a secondary of 115/230 v. supply that feeds switch S3 with 115 v. for A.C. control, exciter lights, indicating lights, solenoid valve coils and relay coils. The transformer 114 secondary also feeds ST1, SR1, ST2 and SR2, as shown on the diagram. ST1 has a secondary circuit 34 that connects to SR1. The rotor of ST1 connects to the 115 v. mid-tap and one line of the 220 v. source circuit 35. The rotor of SR1 is connected to the 115 v. mid-tap but to the opposite side of the 220 v. line that ST1 rotor connects to. ST2 and SR2 are identically so connected. For illustrative purposes of the mechanical and electrical functions of this invention, I state that the train is approaching a photo-electric station 11a (Fig. 1). A cam 67 contacts a micro-switch 68a (Fig. 15) that energizes relay coil R3 (Fig. 15) that closes contacts S8 (Fig. 15) which energizes spotlights 20a and 20b (Fig. 15) that in turn by means of EM3 and, 131 (Fig. 16) lights the spotlights 20c and 20d of 11a (Fig. 16). While the train is passing 11a, a cam 67 closes switch 68b and the light beams from 11a energizes EM2 (Fig. 15) and closing contacts of lines 147 of 21 on car C (Fig. 15) that closes the circuit of relay coil R2 (Fig. 15) that in turn closes the normally open D.C. contacts S7 (Fig. 15) that energizes the slip compensator coil 93 (Fig. 13) actuating lever 92 (Fig. 13). The normally, closed contacts S7 (Fig. 15) of relay R2 (Fig. 15) have opened and de-energized the clutch coil 102. (Fig. 14). The timing wheel 66 (Fig. 13) is now free to spot, should it be out of time. The spot timing cycle is a two-way excitation and photo-electric pickup which is accomplished by the drum 66 (Fig. 10) moving cam 67 to contact micro switch 68a that actuates relay R3 (Fig. 15) that turns spot lights 20a and 20b (Fig. 15) on, that are on the train, for the purpose of exciting EM3 pickup in 11a (Fig. 1 and Fig. 16) that actuates relay R6 (Fig. 16) that turns spot lights 20c and 20d (Fig. 1 and Fig. 16) on, for the purpose of exciting EM2 pickup (Fig. 15) on the train to close the circuit of wires 147 (Fig. 15) that completes the circuit for relay R2 (Fig. 15) that energizes the slip compensator coil 93 (Fig. 13 and Fig. 15). Micro switch 68b is also contacted by another cam 67 at the same time as 68a. 68b is a set up switch for the spot time cycle. As soon as the compensator coil 93 (Fig. 13) operates and the V-arm 92 and 92a (Fig. 13) projects into 90a (Fig. 13) the drum 66 (Fig. 13) will have moved to a position to have cleared cams 67 off of micro switches 68a and 68b (Fig. 15) with the subsequent positioning of drum 66 (Fig. 13) and being in perfect time and/or position relative to the photo pickup station 11a (Fig. 1 and Fig. 16)—all accomplished by the distance timing calibrated units 91 (Fig. 13) of unit 18 and unit 19 of Fig. 3 and Fig. 10. The train's distance of travel is what makes the drum 66 (Fig. 13) contact said micro switches at the appropriate time to advance the drum 66 (Fig. 13) until cams clear stated switches, causing and creating an electro-mechanical and an electronically self-correcting timing arrangement.

Push button PB1 permits maintenance crews to operate the slip compensator coil 93 and subsequent de-energizing the clutch coil 102 at any designated point along the route. Switch S9 that energizes the brake coil 100 is opened only when the train starts its route and at that time, the clutch coil 102 is also de-energized so that the safety inspector can move the inner and outer flanges 101 and 103 respectively (Fig. 14) in the direction necessary to remove the slack motion out of the gears in gear box 60.

For the purpose of clarity, an illustration of the functions of this invention during one speed limit, all being identical in principle, there is no reason to elucidate the remaining four. The train is a mile away from the slowing down area, traveling 75 m.p.h. approaching a 30-mile speed zone. Micro-switch 69e that energizes exciting light 56e and the 30-mile warning light 116e in car C and warning light 117e in locomotive L, has turned said lights on.

EM1 sensitivity relay (unit SC) normally closed contacts of lines 148 as shown in Fig. 17 are used (whereas the normally open contacts that close lines 147 when the relays are actuated in EM2 on the train and EM3 in 11a (Fig. 16) are used) which are in series with the master relay coil R1 will have to open before micro- switch 68c contacts the master relay cam, otherwise the circuit of relay R1 will be complete, and close contacts S6 which energizes wires 16a and 16b with the subsequent closing the fuel injectors solenoid valve 13, the release air pressure port solenoid valve 14d of the automatic brake valve on the locomotive and opening solenoid valve 14 between the feed valve and the main brake pipe, thereby shutting the fuel off of the engines and applying the brakes of the train automatically—providing, the light transfer speed indicating control dial has not moved into a position so that the exciter light 56e passes the light beam through slot 52e (Fig. 5) and into the chrome port tube 57 to energize EM1 sensitivity relay and open the normally closed contacts of lines 148. The unit SC (Fig. 4) employs a conventional selsyn receiver SR2 that has disc 42 with coils 43 mounted on its shaft, that electro-magnetically repels and attracts a second disc 49 (Fig. 7 and Fig. 4) with coils 50, to position a speed indicating control dial 51, mounted on shaft 45 that is resisted by opposing torque torsional springs 53a and 53b (Fig. 4, Fig. 8 and Fig. 9). The faster the train goes the greater will become the degree of the arc from zero position on dial 51, as shown in Fig. 5, and therefore different speeds can be controlled thru the micro switches 69a for the 90 m.p.h. zone, 69b for the 75 m.p.h. zone, 69c for the 60 m.p.h. zone, 69d for the 45 m.p.h. zone, and 69e for the 30 m.p.h. zone (as shown by the circuitry on Fig. 15). As the drum 66 (Fig. 13) moves cams 67 (Fig. 13) on said switches, as earlier described, dial 51 (Fig. 5) will control the train speed thru the arcuate elongations 52a for the 90 m.p.h. zone, 52b for the 75 m.p.h. zone, 52c for the 60 m.p.h. zone, 52d for the 45 m.p.h. zone, and 52e for the 30 m.p.h. zone. Also shown in Fig. 5 are the exciting lights 56a for the 90 m.p.h. zone, 56b for the 75 m.p.h. zone, 56c for the 60 m.p.h. zone, 56d for the 45 m.p.h. zone and 56e for the 30 m.p.h. zone, for EM1 (Fig. 15).

Dial 51 does not revolve as does disc 42 (Fig. 4) that is mounted on the exterior shaft of SR2 (Fig. 4), but only changes its position as the train goes faster. All of the sensing is obtained from the distance calibrated timing element unit 18 Fig. 2 (and 91, Fig. 13). In unit 19 wheel 30 (Fig. 3) rolls on the track and measures the distance. The selsyn transmitter ST1 is driven directly by wheel 30 which subsequently turns SR1 (Fig. 10) synchronously and the gear train in box 60 (Fig. 10) reduces the r.p.m. of wheel 66 (Fig. 10 and Fig. 13) to one revolution for the entire route, as chosen by railroad officials. Should there be 100 30-mile speed zones on a given route, then there would be 100 different cams 67 (Fig. 13) that would contact micro switch 69e, mounted on wheel 66 (Fig. 13) and spaced relative to the distance that separated each 30 mile zone on the route. The same principle automatically applies to all the speed zones to be controlled. The length of the zone determines the length of said cams. The speed control is performed by element SC (Fig. 4) that is driven electrically by elements 18 and 19 (Fig. 3 and Fig. 10).

Should the said 30-mile speed zone be 7.35 miles in length, the length of the master relay cam 67 would of necessity contact micro-switch 68c, 1 inch. The cam that contacts micro-switch 69e would be longer than 1 inch to provide time for warning by the warning lights 116e and 117e, while approaching the speed zone.

A motor 119 drives a blower 118 to keep the chrome tube, that houses EM2, clean and the ends of the chrome tube 21 unobstructed. A connector plug 17 is used for the different electrical circuits between car C and locomotive L (Fig. 1). The timing unit 18 is driven by unit 19 under car C that rolls on the tract 10 and drives ST1. Unit SC is the speed indicating and control assembly.

Fig. 16 is an electrical schematic of the photo-electric stations 11a and 11b (Fig. 1), located along the train's route. The lines 12 and 12a feed switch 130 that in turn feeds R4 and R5 relay coils. The motor 134 drives blower 133 continuously to keep chrome tube 131 clean.

Indicating light 132 is for power observation as the train passes.

In Fig. 18 I show a timing-calibration means which could replace the wheel 66. In this arrangement, the total length of a tape 200 would equal the perimeter of the wheel 66, the tape being wound from one reel 266a to another reel 266b, the former being pulled by the shaft 64. The tape would have a plurality of cams 267 attached thereto and said cams would activate switches 268 in much the same manner as in the case of the wheel arrangement.

In Fig. 19 I show another modification wherein a tape 300 is reeled from a reel 366a to another reel 366b, the tape having openings 367 therein so that the levers of switches 368 would protrude through said openings to cause activation of switches 368.

In Fig. 20 I show still another modification in which a tape 400 is reeled from a reel 466a to a reel 466b, said tape having thereon a plurality of perforated bands whereby a magnetic pick-up and/or a light responsive device 468 would be the medium of initiating an electrical circuit in much the same manner that sound is picked up from a movie film.

In Figures 18, 19 and 20, it is intended that shaft 64 (Fig. 13) be the pulling element that pulls the tapes past the respective micro-switches and/or the magnetic or light responsive elements to initiate the activation of respective electrical circuits as are initiated by the arrangement in Fig. 10.

Shaft 64 would have mounted thereon, a sprocket to engage perforated edges of tape 200 (Fig. 18), tape 300 (Fig. 19), and tape 400 (Fig. 20), said engagements to be the pulling means, whereby the tapes will unwind from reel 266a (Fig. 18), reel 366a (Fig. 19), and reel 466a (Fig. 20).

It is understood that, as the wind-up of said tapes on shaft 64 occurs, the circumferential measurements changes and the locations of cams on tape 200 (Fig. 18), openings in tape 300 (Fig. 19) and perforations in tape 400 (Fig. 20) will be located thereon to compensate for the difference in the circumferential measurements as the wind-up of said tapes occurs on shaft 64 (Fig. 13). A magnetic brake on reel 266a (Fig. 18), reel 366a (Fig. 19) and reel 466a (Fig. 20) would be used to keep said tapes tightened for accuracy purposes much as in the same manner as brake coil 100 (Fig. 14) functions.

A magnetic clutch on reel 266b (Fig. 18), reel 366b (Fig. 19) and reel 466B (Fig. 20) would be used as in the same manner as clutch coil 102 (Fig. 14) to utilize the spot timing cycle. The edges of reel 266b (Fig. 18), reel 366b (Fig. 19) and reel 466b (Fig. 20) would be provided with notches 90a (Fig. 13) to utilize the engagement of the V-shaped projector 92a after the energization of the slip compensator coil 93 has occurred to complete the spot timing cycle as described in the preceding specification with the arrangement of wheel 66 (Fig. 13).

Obviously, the modified embodiments serve mainly to reduce the space required for these particular elements and, as compared to the wheel arrangement, calibrations can be thus more accurately controlled.

In Fig. 5, I show adjustable covers 52g, said covers being provided to vary the circumferential length of either of the elongations 52a—52e, so that light sources passing therethrough may be varied to more accurately calibrate speed relation.

The summary of the foregoing specification is that:

(1) The timing drum 66 cam 67 contacts the speed zone micro-switch 69a (Fig. 13) that the train is entering and all necessary relays and electrical circuits have electrical continuity to apply the brakes and shut the fuel supply off, to the train—should not the light transferring, speed indicating dial 51 (Fig. 5), be in the correct speed indicating position to transfer the condensed exciting light to open the EM1 pick-up sensitivity relay normally closed contacts when the master relay cam 67 contacts micro-switch 68c (Fig. 15), because when micro-switch 68c closes, conductors 148 energize R1 that subsequently closes S6 contacts that energize conductors 16a and 16b (Fig. 15) with the subsequent operation of solenoid 13, solenoid 14 and solenoid 14d that applies the brakes and shuts the fuel off (Fig. 15). Micro-switches 69b, 69c, 69d, and 69e are for other speed zones.

(2) The timing drum 66 cam 67 (Fig. 13) contacts the slip compensator micro-switch 68b and the exciter spotlights 20a and 20b micro-switch 68a (Fig. 15) to initiate the excitation on EM3 pick-up tube 131 (Fig. 16) that subsequently energizes the exciting spotlights of 11a (Fig. 1) that in turn excites EM2 pick-up tube 21 that closes the circuit of conductors 147 (Fig. 15), that energizes coil R2 that operates S7 that de-energizes the clutch coil 102 and energizes the slip compensator coil 93 that completes the subsequent operation of the spot timing cycle to give this invention the required accuracy to make it operable.

In the claims:

1. A rail vehicle calibrated speed control means comprising a first source of current, a vehicle carried pre-set speed selector and distance sensing device embodying a first transmitter and a rail engaging device to drive said first transmitter, said first transmitter to drive a first receiver, said first receiver to drive a first means, said first means embodying a plurality of speed selector means and varied distance sensing means, the embodiment of an electric brake with a coil and a flange for magnetic flux drag, said speed selector means and distance sensing means comprising positioned cams on a drum to sequentially contact switches to initiate electrical circuits for a first light responsive device in a second means to throttle and brake control means associated with the motive and braking elements of said vehicle, said first means to further embody means to initiate electrical circuits and devices for comprised remote second light responsive devices at reference points along the route of said vehicle for automatic corrections of the first means, said reference points embodying means to activate third light responsive means on said vehicle to initiate circuits to operate embodied electrical devices on said first means to de-energize an embodied electrical clutch and to position an embodied cam mechanism relative to embodied reference point locations, said electrical clutch comprising a coil and suitable metallic construction on a drum for magnetic flux paths, said cam positioning mechanism comprising a coil with suitable levers to move a drum having said cams attached thereto to position said cams relative to said reference points, said first means to further comprise a second source of current embodying a second transmitter, said second transmitter to drive a second receiver embodied in a second means, said second means comprising a third source of current embodying a first disc with coils energized from a first set of conventional collector rings attached to the output shaft of said second receiver, said first disc coils to repel and attract a second disc with coils energized from a second set of conventional collector rings, said second disc being mounted on an input shaft journaled in suitable bearings, a control dial embodying a plurality of arcuate slots mounted on said input shaft, embodiment of a spring dynamometer device attached to said input shaft in convergence with contrasting electrical energy from said third source of current, said spring dynamometer device embodying a co-efficient of electrical energy and speed sensing phenomena, said spring dynamometer device embodying means to sense speed in both directions of said vehicle's travel, said second means comprising a speed sensing control element embodying the mentioned first light responsive means and a light excitation means through the median of the mentioned control dial to said first light responsive means, said first light responsive means to activate embodied electrical devices to throttle and brake control said vehicle, said first light responsive excitation means energized from the sequentially operated switches on the first means, said second means having embodied therein a plurality of speed sensing ranges and varied speed control ranges in both directions of said vehicle's travel.

2. A vehicle carried pre-set speed selector control and distance sensing device as in claim 1 comprising warning signals positioned in said rail vehicle energized by speed range selector light responsive excitation light circuits.

3. A vehicle carried pre-set speed selector control and distance sensing device as in claim 1 comprising a tape provided with spaced openings therein to initiate electrical circuits sensing distance, speed ranges and reference points along the route of travel of said vehicle.

4. A vehicle carried pre-set speed selector control and distance sensing device as in claim 1 comprising a tape having electronically recorded thereon, signals which may, by means of magnetic pickup elements be used for initiating electrical devices for sensing distances, speed ranges and reference points along the route of travel of said vehicle.

References Cited in the file of this patent

UNITED STATES PATENTS

| | | |
|---|---|---|
| 1,826,492 | Babson | Oct. 6, 1931 |
| 1,895,925 | Hammond | Jan. 31, 1933 |
| 2,479,986 | Thomas | Aug. 23, 1949 |
| 2,557,954 | Durheim et al. | June 26, 1951 |
| 2,623,990 | Key | Dec. 30, 1952 |
| 2,751,553 | McEntee | June 19, 1956 |
| 2,769,900 | Maile | Nov. 26, 1956 |
| 2,891,144 | Yalick | June 16, 1959 |
| 2,905,889 | Duke | Sept. 22, 1959 |